Patented June 18, 1929.

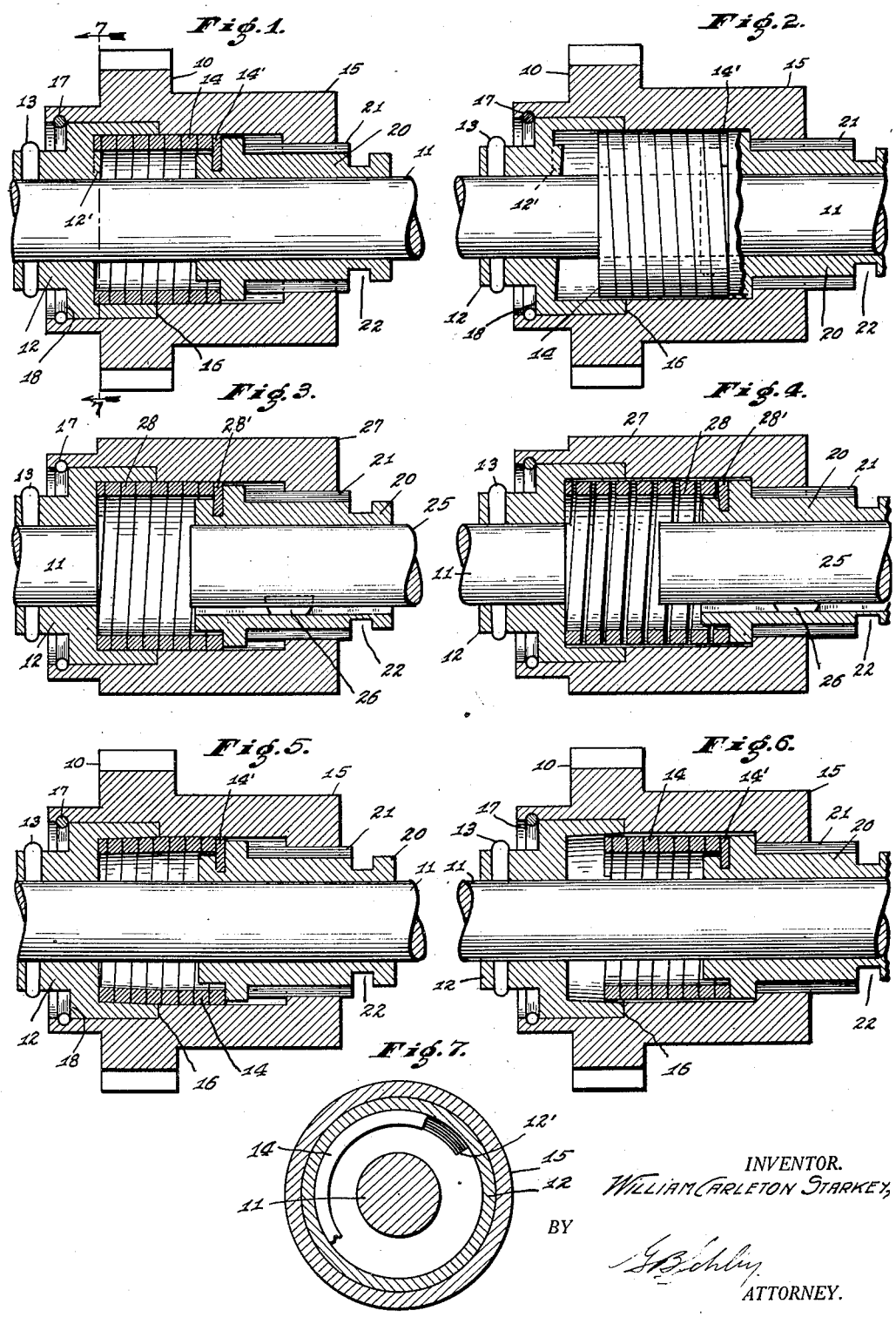

1,718,197

UNITED STATES PATENT OFFICE.

WILLIAM CARLETON STARKEY, OF INDIANAPOLIS, INDIANA, ASSIGNOR TO L. G. S. DEVICES CORPORATION, OF INDIANAPOLIS, INDIANA, A CORPORATION OF INDIANA.

DISENGAGEABLE SPRING CLUTCH.

Application filed May 16, 1925. Serial No. 30,763.

It is the object of my invention to produce a clutch which may operate between two relatively rotatable, coaxial members and which may be engaged to clutch said two members together when they tend to rotate relatively in one direction while permitting free relative rotation in the other direction, the clutch when disengaged permitting free relative rotation of the rotating members in either direction.

I accomplish the above object by providing the two relatively rotatable members with alined circular recesses, and I provide a helical spring extending between said two members and received within both recesses, this spring in its unstressed condition being slightly smaller in external diameter than the diameter of such recesses; and I provide means for engaging this spring with one of the rotatable members so that the spring may unwind and expand against the walls of said recesses to clutch the two members together when they tend to rotate relatively in a direction to unwind the spring.

The accompanying drawing illustrates several modifications of my invention; Fig. 1 is a longitudinal section of my clutch in engaged position and arranged to operate between a shaft and a gear mounted thereon; Fig. 2 is a longitudinal sectional view of the clutch shown in Fig. 1, but with the clutch disengaged; Fig. 3 is a longitudinal section of a clutch arranged to connect two shafts, the clutch being shown as in engaged position; Fig. 4 is a longitudinal section of the clutch shown in Fig. 3, but with the spring disengaged; Fig. 5 is a longitudinal section of a clutch similar in purpose to Fig. 1, but embodying a different method of engaging the clutch; Fig. 6 is a longitudinal section of the clutch shown in Fig. 5, with the spring disengaged; and Fig. 7 is a transverse section on the line 7—7 of Fig. 1.

In the modification of my invention illustrated in Fig. 1, the clutch is arranged to connect a gear 10 to a shaft 11. A collar 12 is rigidly mounted on the shaft 11, as by the taper pin 13, and is provided on its opposite end with a central cylindrical recess for the reception of a helical spring 14. The spring 14 extends beyond the end of the collar 12 and into a cylindrical recess in the hub 15 of the gear 10. The recess in the hub 15 is shouldered as at 16 to permit the reception of the collar 12 within such recess, the end of the collar 12 abutting against the shoulder 16.

The gear 10 is prevented from moving axially relative to the collar 12 by means of a split wire ring 17 received in an annular groove in the recess of the gear hub and bearing against a shoulder 18 on the collar 12.

Slidably mounted on the shaft 11 is a sleeve 20 which passes into the recess in the gear hub 15 and is provided with splines 21 which mate with corresponding splines in the gear hub. The inner end of this sleeve 20 is provided with a recess for the reception of the inturned end 14' of the coiled spring 14. The sleeve 20 may also be provided exteriorly of the gear hub with an annular groove 22, to be used in connecting the sleeve 20 to any convenient well known shifting mechanism for shifting such sleeve axially of the shaft 11.

When the spring 14 is free from any stresses, as it is with the parts in the position shown in Fig. 2, its external diameter is slightly smaller than the internal diameter of the recesses in the collar 12 and gear hub 15, so that with the clutch disengaged as in Fig. 2, the spring does not bear against the walls of these recesses. To engage the clutch, the sleeve 20 is moved axially of the shaft from the position shown in Fig. 2 to the position shown in Fig. 1, whereupon the squared end of the spring 14 engages a shoulder 12' on the collar 12. If the shaft 11 and the gear 10 are rotated relatively to each other in the direction tending to unwind the spring 14, this spring will be unwound, for one end of it engages the collar 12 which is rigid with the shaft 11, and the other end is prevented from rotating relatively to the gear 10. Upon unwinding, the spring 14 expands and grips the walls of the recesses in the collar 12 and the gear hub 15 and clutches these two parts together. Should the gear 10 and shaft 11 tend to rotate in the direction to wind the spring 14, such winding causes the spring to be reduced in diameter and to become disengaged from the walls of the recesses, thus permitting free relative rotation of the gear and the shaft 11.

In the construction illustrated in Figs. 3 and 4, the clutch is adapted to form a driving connection in one direction between two coaxial shafts 11 and 25. The shaft 11 carries a collar 12 keyed to the shaft by the taper pin 13, these parts being the same as the corresponding parts shown in Figs. 1 and 2. The shaft 25 carries the sliding sleeve 20 which has the splines 21 and the groove 22 as also shown in Figs. 1 and 2. In this modification, however, the sleeve 20 is keyed to the shaft 25 by means of a key 26 which prevents relative rotation of the sleeve 20 and the shaft 25 while permitting the sleeve 20 to slide on such shaft. A member 27, corresponding in function to the gear hub 15 shown in Figs. 1 and 2, is provided with a shouldered recess for the reception of the spring 28 such recess being the same as that in the gear hub 15 shown in Fig. 1. The spring 28 has an in-turned end 28' which is received within a recess in the sliding sleeve 20, exactly as the in-turned end 14' of the spring 14 shown in Figs. 1 and 2 is received in the recess in the sleeve 20.

The spring 28 of the modification shown in Figs. 3 and 4 differs from the spring 14 shown in Figs. 1 and 2. The spring 28 is an open-wound spring, so that when it is unstressed its turns are separated from one another as shown in Fig. 4. After winding, the spring is compressed until the coils are together and the exterior surface of the spring is then finished, as by grinding, to an external diameter slightly larger than the internal diameter of the recesses in the collar 12 and the member 27. When the coiled spring so finished is permitted to take its normal position with the spring-turns separated, its diameter will be reduced so that when the spring 28 is placed in position as shown in Fig. 4, its external diameter is slightly less than the internal diameter of the recesses in the parts 12 and 27. As a result, when the sleeve 20 is in its right hand position as shown in Fig. 4, the spring 28 is out of engagement with the walls of the recesses. When the sleeve 20 is moved to the left to the position shown in Fig. 3, the axial compression of the spring results in an increase in its external diameter and causes the spring to bear against the walls of the recesses. If, while in this position, the shafts 11 and 25 tend to rotate in the direction to unwind this spring, the spring expands and firmly grips the surfaces of the recesses, thus locking the two shafts together. Should the two shafts tend to rotate relatively in a direction to wind the spring, the spring decreases in diameter and permits relative rotation of the two shafts.

The device illustrated in Figs. 5 and 6 has the same function as that illustrated in Figs. 1, 2, and 7 and contains the same parts numbered 10 to 22 as does the device of Figs. 1, 2, and 7. However, in place of providing the shoulder 12' in the bottom of the recess in the collar 12, this recess near the bottom is tapered to a diameter smaller than the external diameter of the spring 14 when such spring is not subjected to any stress. With the sleeve 20 in the position shown in Fig. 6, the spring 14 is moved out of this tapered position of the recess in the collar 12, and thus is free from engagement with the walls of either recess. When the sleeve 20 is moved to the position shown in Fig. 5, the left hand end of the spring 14 engages the tapering walls of the recess of the collar 12. If, with the spring 14 and sleeve 20 in the position shown in Fig. 5, the gear 10 and the shaft 11 tend to rotate relatively in a direction to unwind the spring 14, the spring is expanded and grips the walls of the recesses in the collar 12 and the gear-hub 15. Free relative rotation in the other direction is permitted, as such rotation permits the spring to be reduced in diameter and to be free from the walls of these recesses.

Each of the modifications illustrated and described makes it possible to connect two relatively rotating parts so that they will be locked together when relative rotation in one direction tends to occur and will be free to rotate relatively in the other direction of relative rotation; and by disengaging the clutch, free relative rotation of the two members in either direction is permitted.

I claim as my invention:

1. In combination, two relatively rotatable members, said members being provided with alined circular recesses, a coil-spring located in said recesses, said coil-spring being normally smaller in external diameter than the diameter of said recesses and also being operatively disengaged from one of said members so that it will not grip the walls of its associated recesses upon relative rotation of said rotatable members in either direction, and means for engaging said spring with that one of said members from which it is normally disengaged so that upon relative rotation of said two members in the direction tending to unwind said spring said spring will expand to grip firmly the walls of its associated recesses.

2. In combination, two relatively rotatable members, said members being provided with alined circular recesses, a coil-spring located in said recesses, said coil-spring being normally operatively disengaged from one of said members so that it will not grip the walls of both associated recesses upon relative rotation of said rotatable members in either direction, and means for engaging said spring with that one of said members from which it is normally disengaged so that upon relative rotation of said two members in the direction tending to unwind said spring said spring will expand to grip firmly the walls of its associated recesses.

3. In combination, two relatively rotatable members, said members being provided with alined circular recesses, a coil-spring located in said recesses, said coil-spring being rotatable with one of said members, and means for operatively engaging and disengaging said spring with the other of said members, said spring when disengaged from said last named member permitting free relative rotation of said rotatable members in either direction.

4. In combination, two relatively rotatable members having alined circular recesses, a coil spring coaxial with said members and located in said recesses, one of said recesses having a diameter greater than the external diameter of said spring when said spring is unstressed, and means for applying a torque to said spring to cause it to expand into gripping engagement with the walls of the recesses in both of said members to clutch them together.

5. In combination, two relatively rotatable members, a coil-spring rotatable with one of said members and normally free from connection with the other member whereby said two members are normally free to rotate relatively in either direction, said members having surfaces arranged to be gripped by said coil-spring upon a change in its diameter, and releasable means operative to cause said spring to transmit a torque between said two members whereby the diameter of said spring will be changed and said spring will grip such surfaces.

6. In combination, two relatively rotatable members, a coil-spring normally free from connection with one of said members whereby said two members may normally rotate relatively in either direction, said members having surfaces arranged to be gripped by said coil-spring upon a change in its diameter, and releasable means operative to cause said spring to transmit a torque between said two members whereby the diameter of said spring will be changed and said spring will grip such surfaces.

7. In combination, two relatively rotatable members, said members being provided with alined circular recesses, a coil spring located in said recesses and being rotatable with one of said members, an abutment rotatable with the other of said members, and means for causing engagement and disengagement of said abutment with the adjacent end of said coil spring.

8. The combination set forth in claim 6 with the addition that said surfaces are arranged to be gripped by said spring when the torque which it transmits is in one direction and to be freed from said spring when the torque is in the other direction.

In witness whereof, I have hereunto set my hand at Indianapolis, Indiana, this 14th day of May, A. D. one thousand nine hundred and twenty-five.

WILLIAM CARLETON STARKEY.